US007762879B2

(12) United States Patent
Cranford

(10) Patent No.: US 7,762,879 B2
(45) Date of Patent: Jul. 27, 2010

(54) BET THE HOUSE BLACKJACK

(75) Inventor: Tony A. Cranford, Morrison, CO (US)

(73) Assignee: Ten Stix Gaming, Inc., Lakewood, CO (US)

(*) Notice: Subject to any disclaimer, the term of this patent is extended or adjusted under 35 U.S.C. 154(b) by 1229 days.

(21) Appl. No.: 10/890,518

(22) Filed: Jul. 14, 2004

(65) Prior Publication Data

US 2004/0259619 A1 Dec. 23, 2004

Related U.S. Application Data

(63) Continuation of application No. 09/977,282, filed on Oct. 16, 2001, now abandoned.

(60) Provisional application No. 60/240,091, filed on Oct. 16, 2000.

(51) Int. Cl.
*A63F 13/00* (2006.01)

(52) U.S. Cl. ............................ 463/12; 463/13; 463/16; 463/20; 273/274; 273/292; 273/304; 273/309

(58) Field of Classification Search ............ 463/12–13, 463/16, 20; 273/274, 292, 304, 309
See application file for complete search history.

(56) References Cited

U.S. PATENT DOCUMENTS

| | | | | | |
|---|---|---|---|---|---|
| 5,632,485 | A | * | 5/1997 | Woodland et al. | 273/292 |
| 5,673,917 | A | * | 10/1997 | Vancura | 273/292 |
| 5,743,532 | A | * | 4/1998 | Lafferty | 273/292 |
| 5,772,211 | A | * | 6/1998 | Nazaryan et al. | 273/292 |
| 5,848,790 | A | | 12/1998 | Huynh | |
| 6,000,699 | A | * | 12/1999 | Long | 273/292 |
| 6,095,525 | A | * | 8/2000 | Terminel | 273/274 |
| 6,109,611 | A | * | 8/2000 | Aramapakul | 273/292 |
| 6,113,102 | A | * | 9/2000 | Marks et al. | 273/292 |
| 6,206,375 | B1 | | 3/2001 | Wichinsky | |
| 6,264,200 | B1 | * | 7/2001 | Smith | 273/274 |
| 6,270,404 | B2 | * | 8/2001 | Sines et al. | 463/12 |
| 6,302,395 | B1 | | 10/2001 | Astaneha | |
| 6,341,778 | B1 | | 1/2002 | Lee | |
| 6,345,823 | B1 | | 2/2002 | Webb | |
| 6,345,824 | B1 | * | 2/2002 | Selitzky | 273/292 |
| 6,450,500 | B1 | * | 9/2002 | Miller | 273/292 |
| 6,789,800 | B2 | * | 9/2004 | Webb | 273/292 |
| 6,808,173 | B2 | * | 10/2004 | Snow | 273/292 |

* cited by examiner

*Primary Examiner*—Peter DungBa Vo
*Assistant Examiner*—Sunit Pandya
(74) *Attorney, Agent, or Firm*—PCT Law Group, PLLC; Raymond Millien; Thomas H. Jackson

(57) ABSTRACT

A casino style card game, played in accordance with the standard rules of Blackjack, also known as "21," and including an auxiliary component allowing additional wagering on the outcome of the dealer's hand for each participating player. Participating players are able to wager on the dealer having a non-breaking hand (i.e., a hand having a value less than 21 in accordance with the rules of Blackjack) containing two, three, four, five, six, or seven cards. Wagers may also be made on the dealer having an even or odd count, or an all red or all black hand. A return is paid on wagers in the auxiliary game only if the dealer hand does not "bust" (i.e., exceed a value of 21). The game is also playable in electronic or other automated versions using, for example, terminals and networks, or slot machines.

7 Claims, 10 Drawing Sheets

FIG. 7A

The probability of a dealer having non-busting hands of 3 through 8 cards is as follows:

| Cards | PO | Odds | Payout | Return % |
|---|---|---|---|---|
| 3 | 266 | 2.76:1 | 2 to 1 | 80% |
| 4 | 0860 | 10.6:1 | 8 to 1 | 78% |
| 5 | .0152 | 64.7:1 | 50 to 1 | 76% |
| 6 | .00172 | 582:1 | 500 to 1 | 86% |
| 7 | .000129 | 7750:1 | 6500 to 1 | 84% |
| 8 | .000065 | 153910:1 | 125,000 to 1 | 82% |

The odds of the dealer having a non-busting hand with an odd or even total:

P(odd) = .399, odds are 1.508:1
With a payout of 1 to 1 the % of return will be 80%.

P(even) = .320, odds are 2.127:1
With a payout of 1.5 to 1 the % of return will be 80%.

The odds of the dealer getting a non-busting hand with all red or all black cards:

In an infinite deck, the chances of an all red ( or all black ) 2 card hand are 1/4 That happens 34.9% of the time. In three cards, 1/8 or 26.6% of the time. In four cards, 1/16 or 8.6% of the time In five cards 1/32 or 1.5% of the time. In six cards 1/64 or .17% of the time etc. This adds up to 12.6% as the probability that you could get an all red or an all black hand.

P(all red) or P(all black) = .253. For any finite number of decks, the probability would be somewhat lower. With a 5 to 1 payout the return % is 77%

FIG. 7B

Frequency of Pat Hands

There are 13 ranks of cards (ace through king). In an infinite number of decks, there would be thirteen possible first cards and thirteen possible second cards. A simple grid would establish that of the resulting 169 two-card combinations, 59 will have total values of seventeen through twenty-one (a pat hand). Where a dealer must hit a soft seventeen, the A-6 and 6-A combinations reduce the fraction to 57 of 169 possibilities.

Where there are a limited number of decks, the effect of removal (a card cannot be matched up with itself) reduces the instance of pat hand totals and also reduces the number of possible two-card combinations. Thus, with one deck, there are (52 x 51) or 2,652 possible two-card hands, of which 920 are pat. With two decks, of the 10,712 (104 x 103) possible first two cards, 3,728 will be pat hands. Six decks yields 97,032 possible two-card combinations, of which 33,840 are pat hands. Eight decks yields 172,640 combinations of which 60,224 are pat hands. Thus incidences of pat hands are:

| No. of decks | frequency | occurrence | |
|---|---|---|---|
| 1 | .3469 | 920 out of 2,652 | or 1 out of 2.8826 hands |
| 2 | .3480 | 3,728 out of 10,712 | or 1 out of 2.8734 hands |
| 6 | .3488 | 33,840 out of 97,032 | or 1 out of 2.8674 hands |
| 8 | .3488 | 60,224 out of 172,640 | or 1 out of 2.8667 hands |
| Infinite | .3491 | 59 out of 169 | or 1 out of 2.8644 hands |

As a check, if you add the probabilities for pat hands, you get .718, which implies a probability of dealer bust of 28.2%. With a payout of 1.5 to 1 the return % will be 88%.

BET THE HOUSE BLACKJACK

This is a Continuation Application of application Ser. No. 09/977,282 filed Oct. 16, 2001 now abandoned, which claims priority to Parent Provisional Application No. 60/240,091 filed Oct. 16, 2000. The disclosure of prior applications is hereby incorporated by reference.

BACKGROUND OF THE INVENTION

1. Field of the Invention

This invention relates to a game, and in particular to a card game that includes both an underlying game, such as Blackjack, also known as "21," and an auxiliary feature in which participating players may optionally select to bet on outcomes of the dealer's hand.

2. Background of the Technology

It is known in the art to provide card games, such as Blackjack, also known as "21," in a casino environment or consistent with casino style rules. In existing variations, the gaming establishment typically seeks to attract as many participants to a game as possible to increase the money collected at the gaming table. In addition, the number of games played during a specified time, such as the number of hands per hour, is an important metric used to evaluate the return potential for a game. That is, the more hands that are played during a unit of time, the greater the money collected by the house and the corresponding profit realized.

With play in accordance with standard Blackjack, each player has no incentive to continue play and to continue betting other than for that player's own hand. The standard betting for Blackjack thus limits the house's ability to collect money from bets for players who lose or otherwise are restricted in their betting.

There is a need for a card game having both standard Blackjack play and an auxiliary wagering feature to increase player betting and player participation, even in the event that the player would otherwise fold or discontinue play.

SUMMARY OF THE INVENTION

The present invention is a casino style card game, referred to in various embodiments as "Bet the House Blackjack," "Bet the House," or "Bet the House Bonus Blackjack." The game is played in accordance with the standard rules of Blackjack, also known as "21," and includes an auxiliary component allowing additional wagering on the outcome of the dealer's hand for each participating player. Participating players are able to wager on the dealer having a non-breaking hand (i.e., a hand having a value less than 21 in accordance with the rules of Blackjack) containing two, three, four, five, six, or seven cards. Wagers may also be made on the dealer having an even or odd count, or an all read or all black hand. A return is paid on wagers in the auxiliary game only if the dealer hand does not "bust" (i.e, exceed a value of 21).

In an embodiment of the present invention, the game is played on a casino style table having a location for the dealer and multiple locations for players. At each player location are betting spots for Blackjack and also the auxiliary Bet the House portion of the game. Each of the Bet the House portions of the game includes multiple betting spots, with differing odds, depending on the dealer's hand event upon which the bet is placed. These dealer hand events include, for example, all red, all black, even hand, odd hand, and number of cards dealer will receive without busting, in one embodiment, the numbers being two, three, four, five, six, or seven cards.

Additional advantages and novel features of the invention set forth in part in the description that follows, considered in conjunction with the accompanying drawing figures, will become more apparent to those skilled in the art upon examination of the following or upon learning by practice of the invention. It is to be understood, however, that the drawings are designed solely for the purposes of illustration and not as a definition of the limits of the invention.

BRIEF DESCRIPTION OF THE FIGURES

In the drawings:

FIGS. 7A and 7B present example probability calculations in accordance with play of an embodiment of the present invention using the payout indicated.

DETAILED DESCRIPTION

Figure 1:
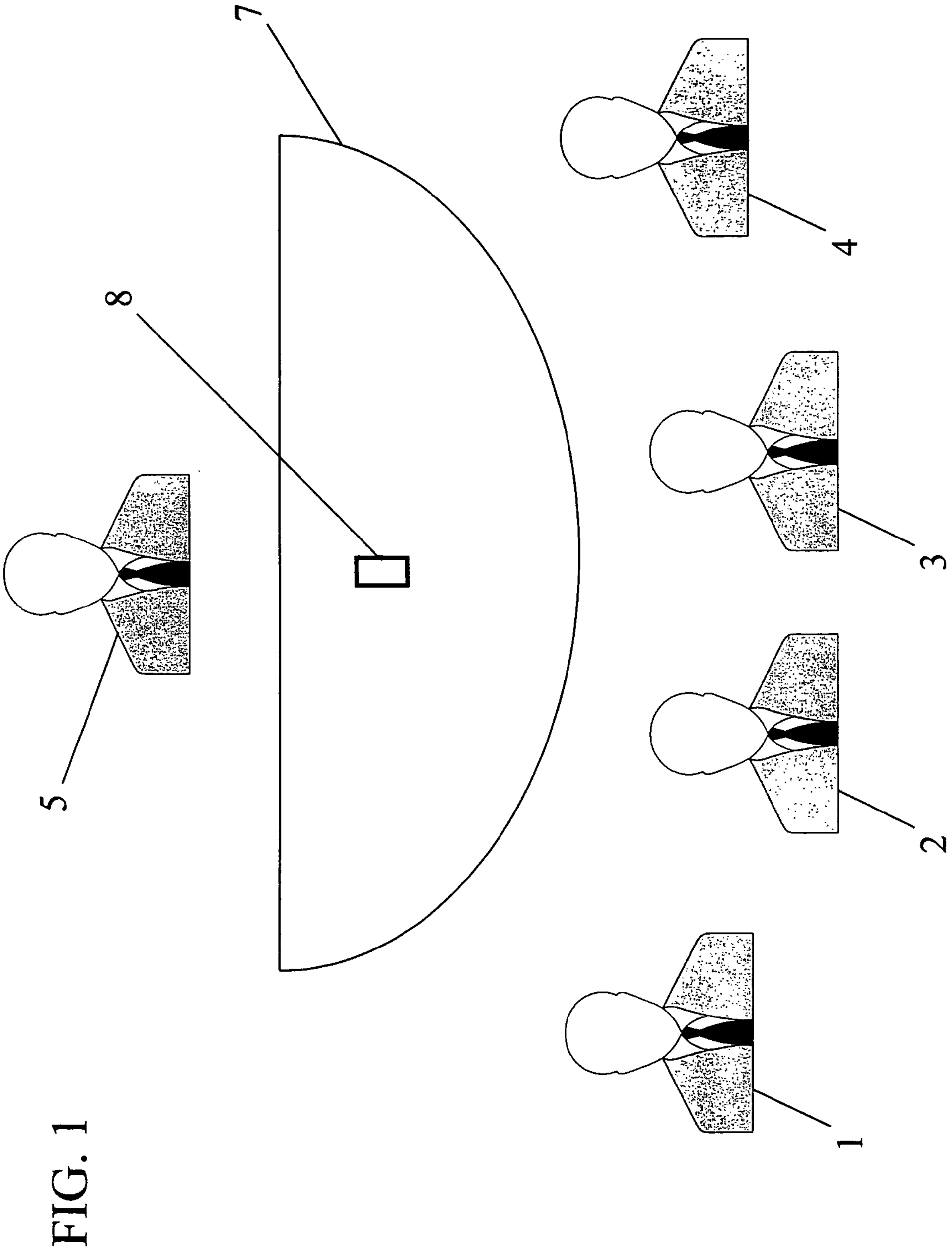
FIG. 1 is an overhead view of a gaming table for play of the game in accordance one embodiment of the present invention.

Play in accordance with one embodiment of the present invention occurs on a standard sized casino gaming table. The layout of the table includes marked areas for one or more players. Each player area includes two betting locations, one for betting in accordance with standard play of Blackjack, and the other for betting on the auxiliary "Bet the House" feature. In an embodiment of the present invention, players are able to select to play only the Blackjack round and play and bet in accordance with the standard rules for Blackjack using only the Blackjack betting location. Players are also able to play both Blackjack and Bet the House in the combined game. However, players are not permitted to play Bet the House without playing Blackjack.

Play of the game, in accordance with an embodiment of the present invention, proceeds as follows. Players indicate their selection to participate in the game by placing at least an initial wager on the Blackjack play indication area. This initial wager is made, for example, in accordance with play with a gaming table of the present invention, by placing a bet on the Blackjack betting spot on the gaming table.

In an embodiment of the present invention, each player also optionally selects whether to play in the auxiliary Bet the House feature of game at the same time the player places the initial bet for Blackjack (marked "BJ"). Selection to play in the auxiliary Bet the House feature, as with selection to play in the Blackjack portion of the game, is made, for example, by placing a bet on one of the portions of the Bet the House betting spot on the gaming table.

The wager for Bet the House is placed on the area corresponding to the bet and return for Bet the House that the player selects. In an embodiment of the present invention, these Bet the House return areas include "all red," "all black," "even hand," "odd hand," "two cards," "three cards," "four cards," "five cards," "six cards," and "seven cards." In an embodiment of the present invention, the amount of the wager for Blackjack and Bet the House is selected by the player and, for example, must fall within the ranges for minimum and maximum bets as typically set by casinos.

After the placement of wagers, in an embodiment of the present invention, cards are dealt for the Blackjack round to each player electing to play and to the dealer. In accordance with standard rules of Blackjack, each player is dealt cards sequentially, beginning with the player to the immediate left the dealer, and proceeding clockwise about the table. The dealer, for example, deals a first card face up or down to each participating player, and one card face down to the dealer. The dealer then deals a second card face up or down to each player, and a card face up or face down to the dealer. Each subsequent card dealt to the players or the dealer are also dealt face up or face down, depending, for example, on the preferences of the house. The game is playable with a single or multiple decks of cards using, for example, a card shoe, in which one or multiple decks are held and cards are dealt one at a time by removal from the shoe.

Play of the Blackjack round then continues in accordance with the standard rules of Blackjack. Each player elects to stand (play with the cards received) or to receive additional cards ("hits") until the player elects to stand or busts (player hand exceeds "21"). Players may also split, double down, and make other play selections in accordance with the standard rules of Blackjack.

When all players have completed their play in the Blackjack round, the dealer plays. In the dealer's play, the dealer begins by turning the dealer's face down card face up. The dealer then elects to either continue to hit or to stand. When the dealer has completed play, the Blackjack round is complete. Players having a bust hand lose their Blackjack round wagers.

In an embodiment of the present invention, the Bet the House betting is then resolved. For each player participating in Bet the House, payouts are determined based upon the dealer's hand. For example, in an embodiment of the present invention, if all of the dealer's cards are red, players betting all red receive a payback of 5 to 1 on the bet made. Similarly, each of the other bet payouts are made, based on each player's bet and the dealer hand. If the dealer busts, no players receive any payout, and all bets are collected by the house. Similarly, any player wagering on an event that does not occur forfeits the bet to the house.

The game is also playable with representations of any of the features described. For example, the game is playable in an electronic or partially electronic manner using a terminal, such as a personal computer, microcomputer, minicomputer, mainframe computer, or other device having a processor and display, such as an electronic hand-held game device, for which representative images of cards are displayable on a screen via a graphical user interface (GUI), or using, for example, a slot machine. The game is also playable in conjunction with performance of selected functions on a network, such as the Internet or an intranet.

The game table used conjunction with an embodiment of the present invention is a standard blackjack or poker sized casino table, in which a dealer occupies one side of the table and players occupy the other. In one embodiment, the table includes a bar located on the dealer's side of the table. The table also includes the name of the game, "Bet the House," "Bet the House Blackjack," or "Bet the House Bonus Blackjack."

References will now be made in detail to embodiments of the present invention, examples of which are illustrated in the accompanying drawings.

FIG. 1 is an overhead view of a gaming table for play of the game in accordance one embodiment of the present invention. FIG. 1 shows an embodiment of the game as played with one or more players 1, 2, 3, 4 and a dealer 5 at a gaming table 7 using one or more decks of cards located at a card location 8.

Figure 2:
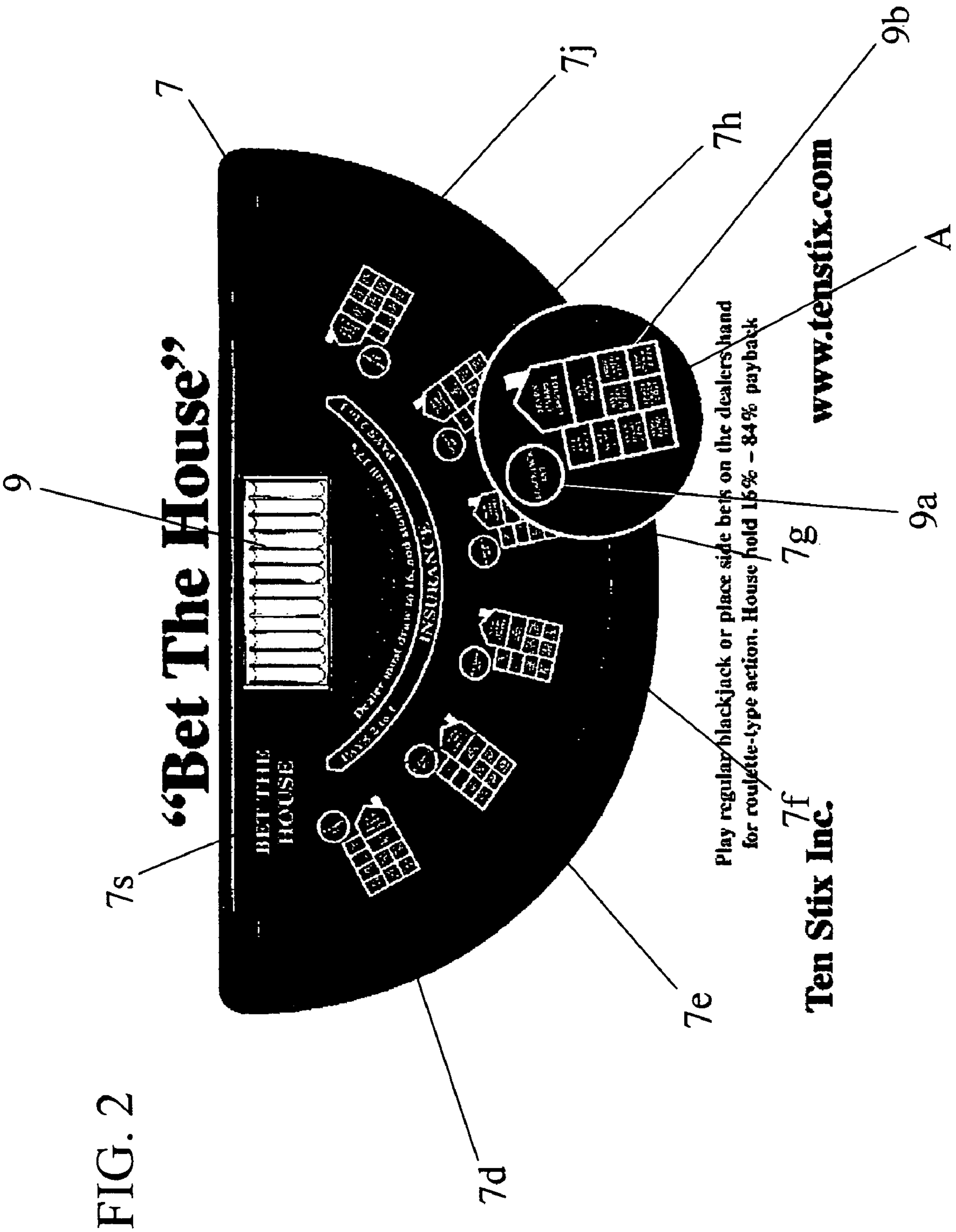
FIG. 2 presents a gaming table layout for a gaming table in accordance with the embodiment of the present invention.

FIG. 2 presents a gaming table layout for a gaming table in accordance with the embodiment of the present invention. As shown in FIG. 2, the table 7 includes a dealer play area 9 and a number of player areas 7*d*, 7*e*, 7*f*, 7*g*, 7*h*, 7*j* on the players' side of the table, the lower side of the table as shown in FIG. 2. As shown blowup "A" of FIG. 2, each player area 7*d*, 7*e*, 7*f*, 7*g*, 7*h*, 7*j* includes two marked areas, a Blackjack betting spot 9*a* marked "Blackjack Bet" for placement of a Blackjack round wager, and a Bet the House spot 9*b* for placement of Bet the House wagers.

Figure 3:
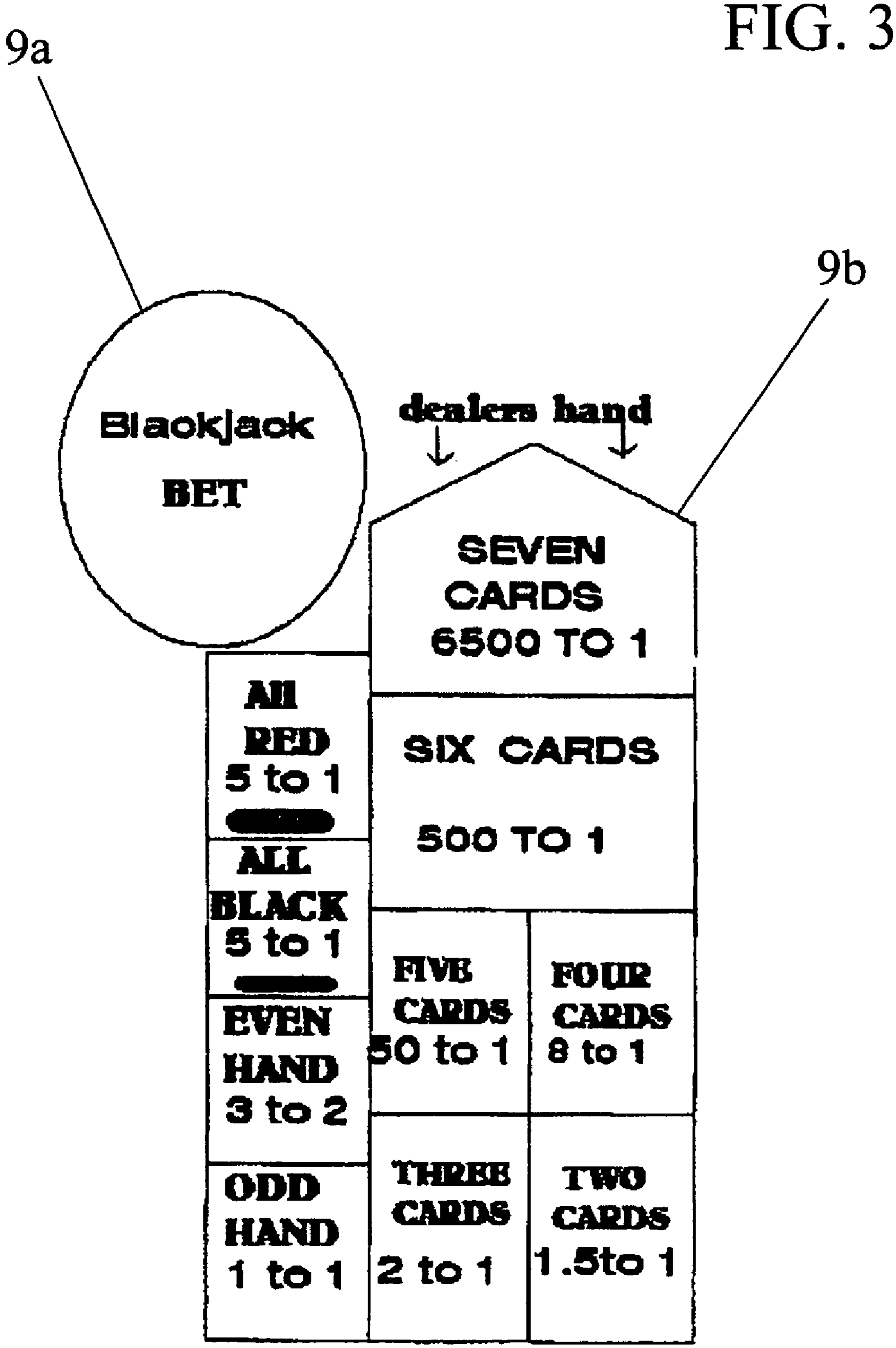
FIG. 3 shows a closeup of an example Blackjack betting spot and Bet the House spot, in accordance with an embodiment of the present invention.

FIG. 3 shows a closeup of an example Blackjack betting spot 9*a* and Bet the House spot 9*b*, in accordance with an embodiment of the present invention.

Figure 4:
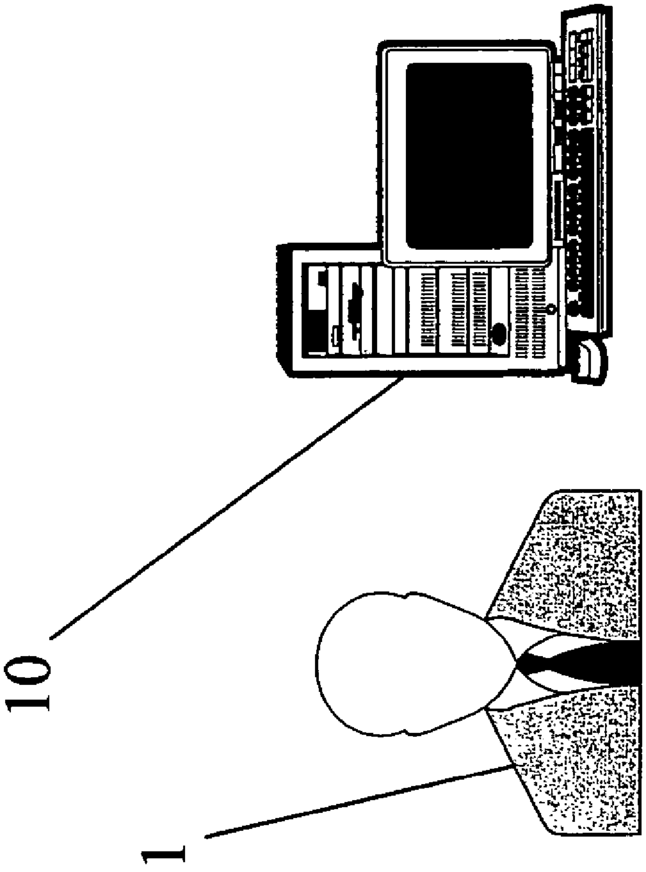
FIG. 4 depicts the components for processor based play of the game in accordance with one embodiment of the present invention.

FIG. 4 depicts the components for processor based play of the game in accordance with one embodiment of the present invention. As shown in FIG. 4, in this embodiment, the player 1 plays at a terminal 10, such as a personal computer, a minicomputer, a microcomputer, a main frame computer, or other device having a display, processor, and GUI, including a hand-held electronic game or a slot machine.

Figure 5:
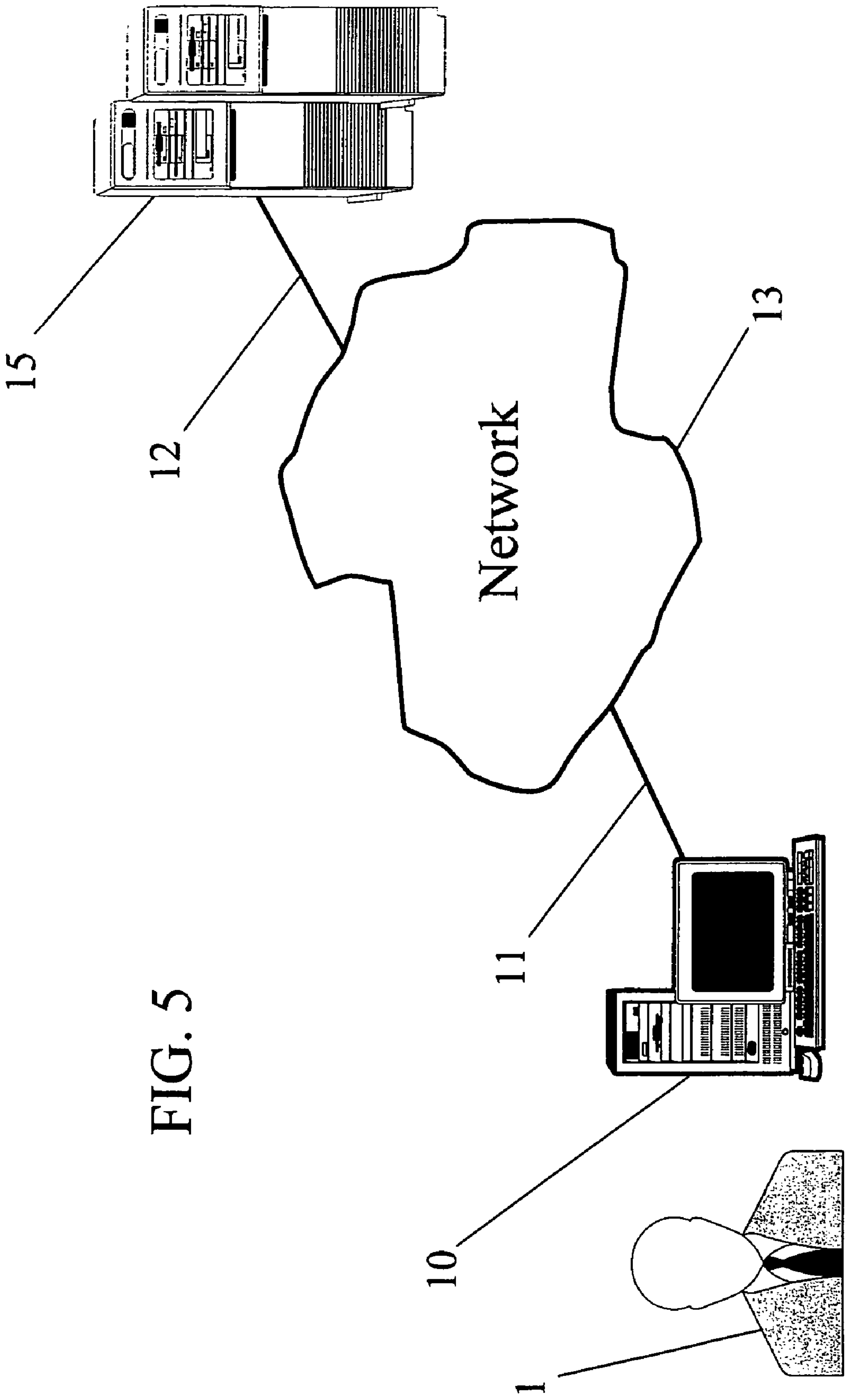
FIG. 5 presents components for play of the game using a processor on a network, such as the Internet or an intranet, in accordance with another embodiment of the present invention.

FIG. 5 presents components for play of the game using a processor on a network, such as the Internet or an intranet, in accordance with another embodiment of the present invention. As shown in FIG. 5, a player 1 plays at a terminal 10, such as a personal computer, a minicomputer, a microcomputer, a main frame computer, or other device having a display and processor. The terminal 10, is connected 11, 12 via, for example, wire, wireless, or fiberoptic coupling to a network 13, such as the Internet or an intranet, to a server 15, such as personal computer, a minicomputer, a microcomputer, a main frame computer, or other device having a processor.

Figure 6A:
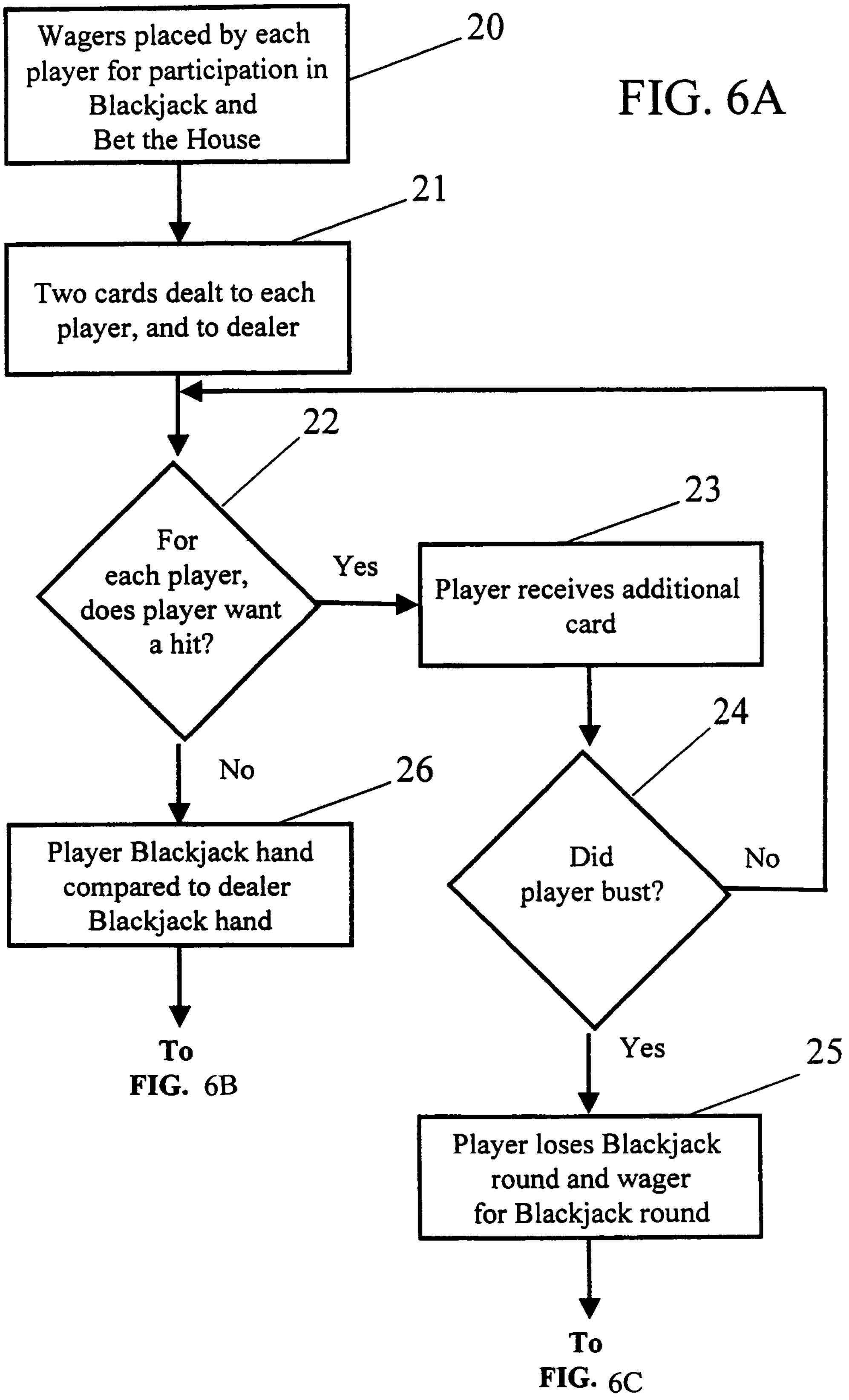
FIGS. 6A-6C show a flow diagram of an example method of play, in accordance with an embodiment of the present invention.
Figure 6B:
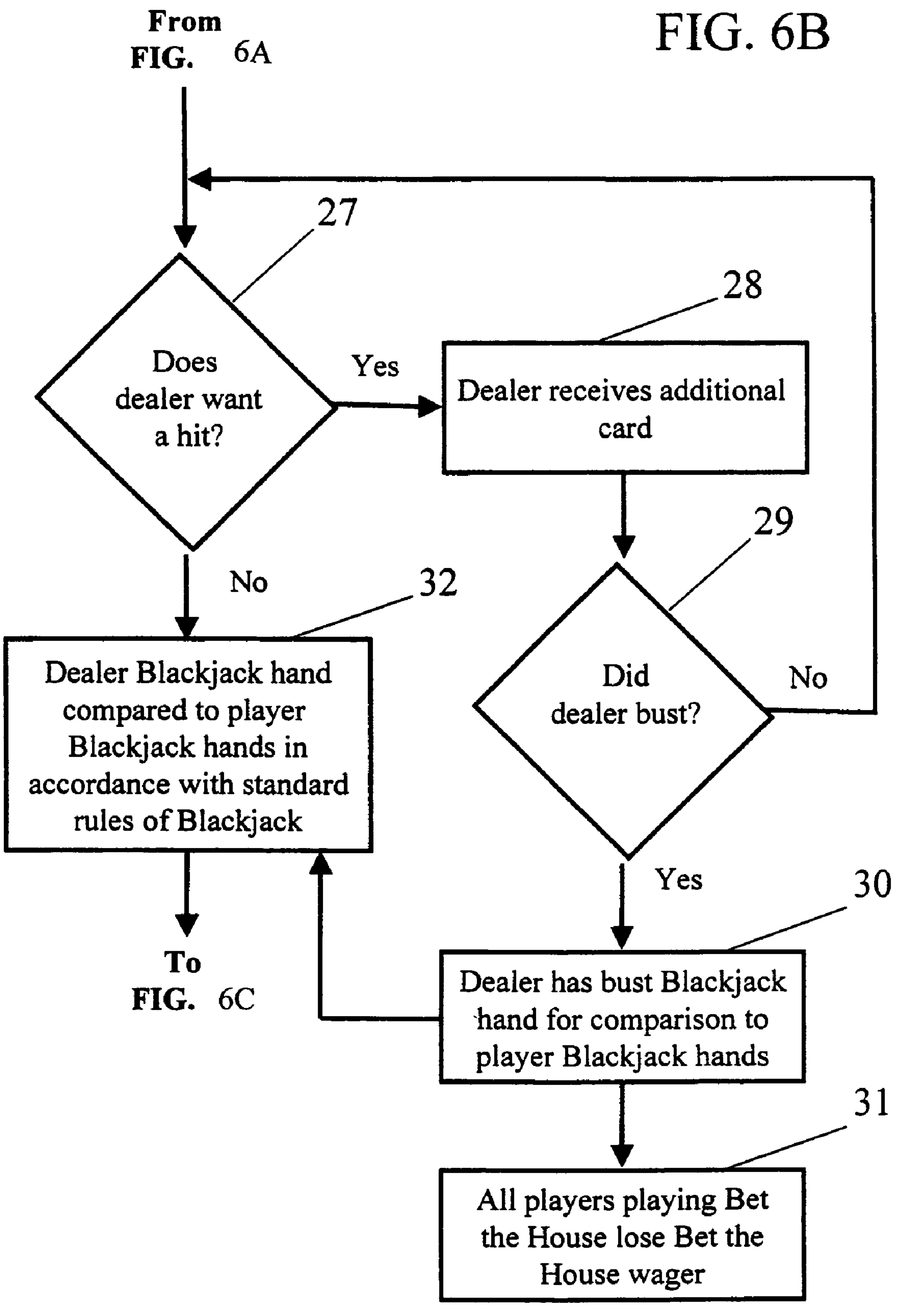
Figure 6C:
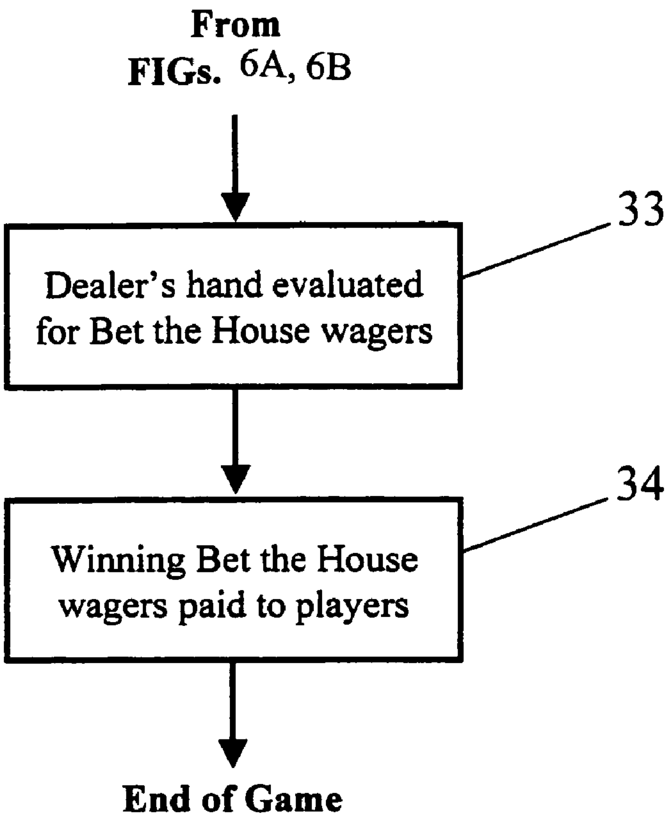

FIGS. 6A-6C show a flow diagram of an example method of play in accordance with an embodiment of the present invention. As shown in FIG. 6A, play begins with each of the players placing wagers for participation in Blackjack and auxiliary Bet the House portions of the game 20. In an embodiment of the present invention, a wager must be placed for the Blackjack game in order for the player to participate in Bet the House.

Two cards are dealt to each player and to the dealer sequentially, the cards being dealt face down, face up, or both face down and face up, for example 21, in accordance with the standard rules of Blackjack and preferred play. Play then continues in accordance with standard rules for Blackjack. A determination is then made by each player as to whether to receive another card, referred to as a "hit" 22. If the player elects to receive an additional card, the card is provided to the player 23. A determination is then made as to whether the player busted 24. If the player busted, the player loses at Blackjack and loses the Blackjack wager 25, and play proceeds to the auxiliary Bet the House portion of the game for the player, as shown in FIG. 5C.

If the player did not bust 24 upon receiving the additional card, the player is provided with another option to receive a hit 22. If the player elects not to take a hit, the player's Blackjack hand is compared to the dealer's Blackjack hand 26, and play proceeds as shown in FIG. 5B.

As shown in FIG. 5B, before comparing the player's Blackjack hand to the dealer's Blackjack hand, the dealer's Blackjack hand is determined. First, the dealer makes a selection as to whether to receive a hit 27. If the dealer elects to receive a hit, the dealer receives an additional card 28. A determination is then made as to whether the dealer busted 29. If the dealer busted, the dealer has a bust hand for comparison to the players' hands for the Blackjack round 30, and all players lose any Bet the House wagers 31. If the dealer did not bust upon receiving the additional card, the dealer is provided with another option to receive a hit 27. The dealer Blackjack hand is then compared to the player Blackjack hands in accordance with the standard rules of Blackjack 32.

Play then proceeds to the auxiliary Bet the House portion of the game, as shown in FIG. 6C. As shown in FIG. 6C, the dealer's hand is evaluated for Bet the House wagers 33. Winning Bet the House wagers are then paid to winning players 34.

FIGS. 7A and 7B present example probability calculations in accordance with play of an embodiment of the present invention using the payout indicated.

Thus, while there have been shown, described, and pointed out fundamental novel features of the invention as applied to embodiments thereof, it will be understood that various omissions, substitutions, and changes in the form and the details of the disclosed invention may be made by those skilled in the art without departing from the spirit of the invention.

What is claimed is:

1. A device for a player to play a card game with representations of a standard deck of cards, the game being played in accordance with rules of Blackjack and including an auxiliary game portion, the device comprising:

a display for displaying the card game, including the representations of a standard deck of cards; and a processor for receiving selections from at least one player for play of the game, for determining progress of play, and for processing and displaying a graphical user interface;

wherein a selection is received to participate in a Blackjack card game from the at least one player;

wherein a selection to participate in the auxiliary game portion is received from the at least one player;

wherein a selection of a dealer Blackjack hand characteristic for the auxiliary game portion is received from the at least one player from which the selection to participate in the auxiliary game portion is received, wherein the dealer Blackjack hand characteristic is selected from a group consisting of at least two of the dealer Blackjack hand being all red, the dealer Blackjack hand being all black, the dealer Blackjack hand totaling an even number, the dealer Blackjack hand totaling an odd number, the dealer Blackjack hand consisting of no more than two cards, the dealer Blackjack hand consisting of no more or less than three cards, the dealer Blackjack hand consisting of no more or less than four cards, the dealer's Blackjack hand consisting of no more or less than five cards, the dealer's hand consisting of no more or less than six cards, and the dealer's Blackjack hand consisting of no more or less than seven cards;

wherein the Blackjack card game is played in accordance with rules of Blackjack, the Blackjack card game including:

sequentially dealing a first card to the at least one player and a first card to the dealer from at least one standard deck of cards;

sequentially dealing a second card to the at least one player and a second card to the dealer from at least one standard deck of cards;

providing an option to receive additional cards to the at least one player and the dealer;

dealing additional cards to each of the at least one player and the dealer selecting to receive additional cards, in accordance with rules of Blackjack, such that the at least one player has a player Blackjack hand and the dealer has a dealer Blackjack hand;

determining whether the at least one player wins the Blackjack round; and wherein the auxiliary game portion results are determined for the at least one player from which a selection to participate in the auxiliary game portion is received, the auxiliary game portion results determination including:

determining whether the dealer hand is non-breaking; and if the dealer hand is non-breaking, determining whether the player wins the auxiliary game portion, regardless of the cards held in the player Blackjack hand, whether the player won the Blackjack game, by determining whether the dealer Blackjack hand matches the player-selected dealer Blackjack hand characteristic.

2. The device of claim 1, wherein the device comprises a terminal.

3. The device of claim 2, wherein the terminal is one of: a personal computer, a minicomputer, a microcomputer, a main frame computer, and a slot machine.

4. The device of claim 1, wherein the display is coupled to a display processor, the display and display processor comprising a display terminal.

5. The device of claim 4, wherein the display terminal is coupled to the processor via a network.

6. The device of claim 5, wherein the network is the Internet.

7. The device of claim 1, wherein the auxiliary game portion results determination further comprises: for the at least one player from which a selection to participate in the auxiliary game portion is received, the at least one player loses the auxiliary game portion when the dealer Blackjack hand is breaking.

* * * * *